Figure 1:
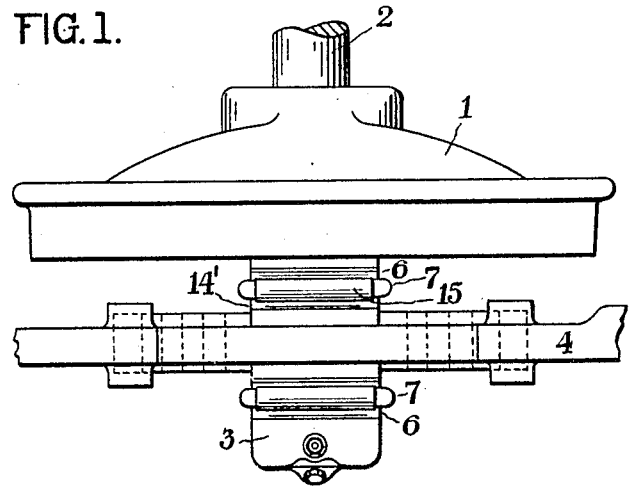

E. PECKHAM.
SUSPENSION OF RAILWAY AND TRAMWAY VEHICLE TRUCKS.
APPLICATION FILED MAY 22, 1906.

904,720.

Patented Nov. 24, 1908.

Witnesses.

Inventor.
Edgar Peckham

E. PECKHAM.
SUSPENSION OF RAILWAY AND TRAMWAY VEHICLE TRUCKS.
APPLICATION FILED MAY 22, 1906.

904,720.

Patented Nov. 24, 1908.

Witnesses.

Inventor.
Elgar Peckham

UNITED STATES PATENT OFFICE.

EDGAR PECKHAM, OF LONDON, ENGLAND, ASSIGNOR TO MARY J. PECKHAM, OF LONDON, ENGLAND.

SUSPENSION OF RAILWAY AND TRAMWAY VEHICLE TRUCKS.

No. 904,720.    Specification of Letters Patent.    Patented Nov. 24, 1908.

Application filed May 22, 1906. Serial No. 318,125.

*To all whom it may concern:*

Be it known that I, EDGAR PECKHAM, a citizen of the United States, residing at Queen Anne's Chambers, Westminster, London S. W., England, have invented certain new and useful Improvements in and Relating to the Suspension of Railway and Tramway Vehicle Trucks, of which the following is a specification.

The present invention relates to an improved means for suspending the truck or under-carriage of railway and tramway vehicles from the axle journal boxes, and is especially applicable to electric or other power driven vehicles.

It has generally been the custom heretofore to suspend the truck from the axle boxes between the pedestals or off-sets of the truck frame in such a manner that the axles and axle boxes could not move in a lateral direction so as to dispel the bad effects of side-thrust which occur when the vehicle is going around curves or when the vehicle lurches when running on an uneven track. The effect of side-thrust is therefore liable to break the wheel flanges and to cause the derailment of the car and will in time by the excessive friction brought on thereby, cause the wheel flanges and rails to rapidly wear away. In addition, on account of the increased friction, more power is required when the car is running on a curved track.

It is the object of my invention to overcome the disadvantages set forth, and in accordance I propose to suspend the truck or under-carriage from the axle journal boxes in such a manner that the axles may move in a lateral direction to relieve the wheel flanges and rail from the bad effect of side-thrust.

My improved means of suspension of the truck from the axle journal boxes consists in forming on top of each of the journal boxes a single groove or two horizontal parallel grooves a suitable distance apart. These grooves are provided to furnish a recess or recesses for a suspension link or links sufficiently strong to safely support the weight of a loaded vehicle. The links straddle the journal box and at the lower end carry a stirrup on which rests the supporting springs or preferably a single semi-elliptical spring. This spring lies beneath the truck side member lengthwise therewith and is shackled or otherwise suitably secured at each end to the lower edge of the said side member. The grooves are preferably made broad enough to permit lateral movement between the journal box and the links thereon and also to allow this lateral movement the grooves, when two links are employed, are far enough apart so that the truck side member may lie between the links and not interfere with the said movement.

It will readily be understood that when side thrust occurs my improved link suspension will permit lateral movement of the axle through the journal box links allowing a lateral movement in the elongated grooves. To lessen friction of the links in the grooves an anti-friction roller may be employed, and to assist in centering the truck the grooves may have inclined sides.

Figure 2:
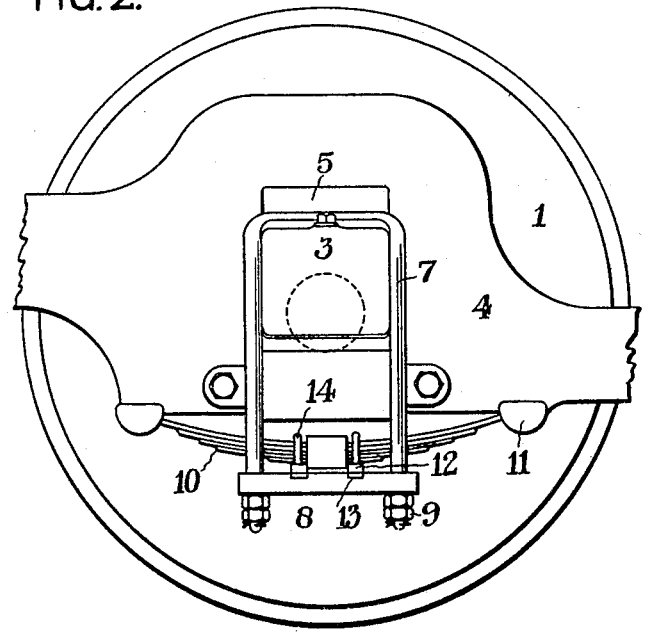
Figure 3:
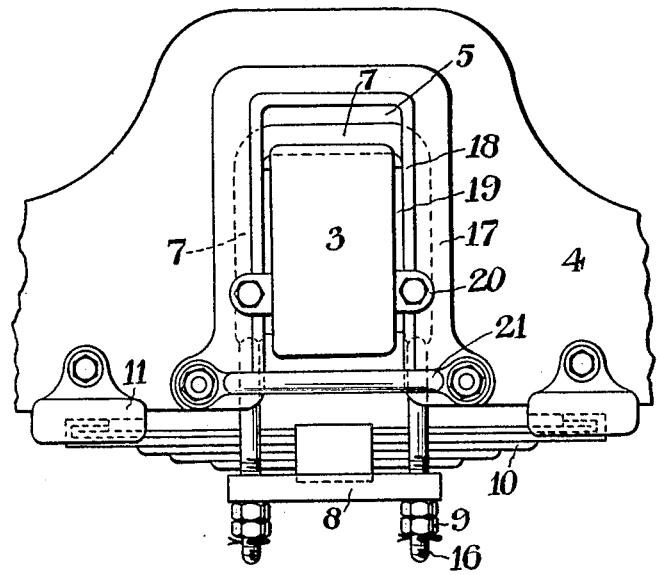
Figure 4:
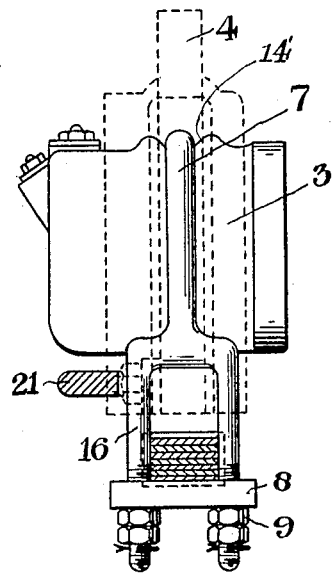

In the accompanying drawings, Figure 1, a plan view of a car wheel, an axle journal box and a portion of the truck frame side member illustrates a double link suspension device; Fig. 2 is a side elevation of a similar construction and parts; Fig. 3 is a side elevation of a portion of a car truck illustrating a single link suspension, and, Fig. 4 is a side elevation of an axle journal box with a single link suspension device hanging therefrom.

Referring first to Figs. 1 and 2 of the drawings, 1 is the car wheel mounted on the axle 2 which axle carries the journal box 3. The car truck frame side member 4 is provided with offsets 5 adapted to receive the journal boxes. These journal boxes fit in the offsets or recesses 5 fairly snug but not so tightly that they will be prevented from moving laterally in said recesses.

When duplex links are employed the journal boxes have formed on their top side two parallel grooves a suitable distance apart to allow the side frame member to be supported between the two links 7, which links rest in the grooves and hang down from the top of the journal box. The links are preferably U-shaped and are hung in an inverted position over the journal box, the legs of the hangers being sufficiently spread apart so that they will not come into contact with the sides of the journal boxes. On the ends of each link I support a plate 8 held in position and capable of being raised and lowered by means of the nuts 9 on the threaded ends of the links. These plates form a seat for the semi-elliptical spring 10 which is placed under the member 4 of the truck frame and secured at its ends in the pockets 11 of the said member. The spring 10 rests on pieces 12 which lie across or bridge the two plates 8 supported on the ends of the links. The bridging pieces are flanged at their ends 13 to retain them in place on the plates 8 and to prevent the displacement of the springs, staples 14 are provided on the bridging pieces to hold the spring 10 in place. This means for supporting the spring permits its easy removal when required and together with the load of the car on the spring, makes it impossible for the spring or any of the parts of the suspension device to become displaced.

The adjusting nuts 9 on the ends of the links serve as means for altering the camber of the spring 10 and also to serve to raise or lower the truck frame to a certain extent, with respect to the axle journal boxes, but if an extra low running truck should be required, a longer link would be employed.

In the construction I have herein described very little swing is imparted to the links when side thrust is given to the car wheels and axles, but the journal boxes instead will move laterally and freely of the suspension links, this being permitted by making the grooves 6 considerably broader than the diameter of the links. The journal boxes can then slide or move laterally free of the links and to assist in centralizing the running gear of the car the grooves are provided with inclined sides 14' which will have a tendency to cause the journal boxes to return to their proper position and to minimize friction between the links and the journal boxes, when the latter move laterally friction rollers 15 may be provided in the links 7.

In Figs. 3 and 4 I have illustrated a suspension device which consists of a single link instead of two links. The construction of the single link illustrated in the figures is also designed for use where semi-elliptical springs are employed in a device for suspending the car truck from the car axle journal boxes. The link consists of a U-shaped forging provided with forks 16 between which lie the semi-elliptical springs 10 secured to the truck member as in the other construction herein described. The prongs of the fork 16 of the hanger carry nuts 9 on their threaded ends and serve to retain the spring seat plate 8 in place on the forked ends of the hanger or supporting link 7. The plate 8 is supported at the four ends of the said link and cannot therefore become displaced, and as the spring 10 lies between the prongs of the forks 16 they also cannot become displaced. This form of link suspension is simpler of construction, cheaper, and has been found in practice in some instances to be as efficient as a device where two links are employed. A single groove is provided on the top of the journal box to receive the link 7 and the location of this groove is such that the link will hang centrally with the side frame member of the truck within the housing formed by the flanged edges 17 of the journal box recess formed in the said frame member of the truck. Between the surface 18 of the flanged edges of the journal box recess 5 and the sides of the journal box, I place wearing strips or plates 19 which are fastened and held in place by means of ears 20 bent at right angles and secured to the truck member 4 by bolts.

The adjustment of the springs and raising and lowering of the truck is effected by means of the adjusting nuts 9 on each of the four ends of the link 7.

To remove the wheels and axle and also the springs 10 the car truck is first raised by screw-jacks to take the strain off the springs 10. The link will be raised out of its groove on the journal box and then to remove the wheels the wheel piece or casting 21 placed across the gap made by the journal box recess is removed by detaching it from the side frame member to which it is attached by means of the flattened ends being bolted to the said frame member. The casting 21 prevents the side walls of the recess 5 from being forced together and thus clamp the journal box therein when end thrust occurs.

What I claim as new and desire to secure by Letters Patent of the United States is:—

1. A device for suspending vehicle trucks consisting of a link or links suspended from the axle journal box and carrying at their lower extremities a seating for a semi-elliptical spring, the said seating being adapted to be raised or lowered by adjusting nuts carried on the ends of the links and grooves in the upper-side of the journal boxes adapted to receive the links and permit free lateral movement of the journal boxes, substantially as described.

2. A spring suspension for vehicle trucks consisting of a supporting spring or springs placed under the axle journal box and resting and held on an adjustable plate carried at the forked ends of a supporting link or links depending from the top of the journal boxes, substantially as described.

3. A suspension device for car trucks consisting of a link suspended from the top of the car axle journal box and provided with forked ends adapted to support a spring seating and retain the spring resting on the said seating in a fixed position, substantially as described.

4. In combination, a car axle journal box provided with one or more grooves in its upper surface, one or more links of less diameter than the breadth of the grooves mounted to swing therein, a seating carried by the end of the links adapted for supporting the car truck, and a spring or springs interposed between the lower portion of said seat and said car truck.

5. In a spring suspension for vehicle trucks, in combination, a journal box provided with a concave groove in its upper surface of less diameter than the breadth of said groove, a link mounted to swing therein, a seating supported by depending ends of said link, and a spring interposed between the lower portion of said seat and said truck.

In witness whereof I have hereunto set my hand this 10th day of May, 1906.

EDGAR PECKHAM.

Witnesses:
ARNOLD J. TANNER,
H. D. JAMESON.